United States Patent [19]

Berger

[11] Patent Number: 4,786,453
[45] Date of Patent: Nov. 22, 1988

[54] FIBER-MATRIX COMPOSITE MATERIALS WITH EXACTLY POSITIONED AND ORIENTED FIBERS AND THEIR PREPARATION PROCESS

[75] Inventor: Michel Berger, Castelnau de Medoc, France

[73] Assignee: Societe de Droit Anglais: Pradom Limited, London, England

[21] Appl. No.: 947,379

[22] Filed: Dec. 29, 1986

[30] Foreign Application Priority Data

Dec. 30, 1985 [FR] France .................. 85 19436

[51] Int. Cl.$^4$ ............................................. B29C 67/14
[52] U.S. Cl. ............................... 264/136; 156/181; 264/103; 264/243; 264/258
[58] Field of Search ........................ 428/86, 90, 96; 156/169, 173, 175, 174, 180, 181, 72; 264/22, 136, 137, 24, 243, 103, 258; 425/805

[56] References Cited

U.S. PATENT DOCUMENTS

| | | | |
|---|---|---|---|
| 2,152,077 | 3/1939 | Meston | 156/273.1 |
| 3,322,868 | 5/1967 | Kruse | 264/158 |
| 3,513,297 | 5/1970 | Jordan | 219/529 |
| 3,515,622 | 6/1970 | Jordan | 156/72 |
| 3,664,909 | 5/1972 | Ackley | 264/258 |
| 3,850,723 | 11/1974 | Ackley | 264/258 |
| 3,889,035 | 6/1975 | Jakes | 264/258 |
| 3,900,651 | 8/1975 | Hoppe | 428/86 |
| 3,951,718 | 4/1976 | Gonzalez | 428/86 |
| 4,132,580 | 1/1979 | Booth | 264/137 |
| 4,164,599 | 8/1979 | Kessler | 156/72 |
| 4,427,221 | 3/1984 | Bompard et al. | 29/429 |

FOREIGN PATENT DOCUMENTS

1491708 7/1967 France .

Primary Examiner—Merrell C. Cashion, Jr.
Attorney, Agent, or Firm—Weingarten, Schurgin, Gagnebin & Hayes

[57] ABSTRACT

Process for the preparation of a composite material formed of reinforcing fibers, regularly distributed and oriented in more than two directions, and of a matrix filling up the space between said fibers.

According to the invention, said process consists in: producing a convex brush of said reinforcing fibers, regularly distributed and fixed by one of their ends on a convex base, said fibers being subjected to an intensive D.C. electrostatic field, oriented in parallel to said fibers so that the fibers are immobilized in stretched condition perpendicularly to the base surface; inserting between said fibers, layers or grids of fibers, disposed successively at 90° from one another, said insertion being carried out while the reinforcing fibers fixed on said base are subjected to the intensive D.C. electrostatic field; removing the elements used for fixing the fibers of the brush; impregnating the fibrous structure with a liquid pre-matrix, and optionally subjecting it to a compression for subsequent densification of the resulting pre-material; and finally, subjecting the pre-material to conditions permitting the formation of the matrix.

2 Claims, 3 Drawing Sheets

FIBER-MATRIX COMPOSITE MATERIALS WITH EXACTLY POSITIONED AND ORIENTED FIBERS AND THEIR PREPARATION PROCESS

FIELD OF THE INVENTION

The present invention relates to new fiber-matrix composite materials with exactly positioned and oriented fibers; the invention further relates to a process for preparing said materials.

BACKGROUND OF THE INVENTION

It is known that composite materials are, for the most part, constituted of reinforcing fibers dispersed in a suitable matrix; the reinforcing fibers which are used are organic or inorganic fibers such as Nylon fibers (aromatic or non-aromatic), carbon fibers, glass-fibers, silicium carbide fibers, boron fibers, etc. The matrices used are also of organic or inorganic nature, such as for example resin. Moreover, these matrices can contain various fillers such as for example: graphite powder, titanium powder, ceramic powder, etc. The materials according to the invention contain fibers and matrices such as described hereinabove.

Composite materials may be mono-, bi- or tri-dimensional in their properties, depending on the orientation or orientations of the fibers.

It is known to produce mono-directional, i.e. parallel fibers held by fine Nylon yarns or glass yarns, etc., or bi-directional composite materials constituted of a plurality of mono-directional layers, stacked and forming different angles between them, or just simply woven. But to produce a tri-dimensional structure, the problem is more complex. All the known processes make use of a special knitting, or of fibers which traverse bi-dimensional assemblies, each fiber being guided by a needle. Certain types of felts, are also used, which are known as tri-dimensional felts and which are no more no less than the conventional knitted pile fabric type.

But it is also known that the properties of the obtained materials can be dependent on the regularity of dispersion and on the orientation of the fibers and that there is an advantage in finding a process whereby such dispersion and orientation in the various directions required, can be accurately controlled. This is precisely the object of the present invention.

SUMMARY OF THE INVENTION

The invention therefore relates to an n-directional composite material, n being at least equal to 3, which is characterized by an accurately controlled positioning and orientation of the fibers in each of said n directions.

The invention also relates to a process for preparing the material according to the invention, which process consists in:

(a) in a first step: producing a convex brush of regularly distributed, reinforcing fibers fixed on a suitably shaped base, which base can, in order to form said convex brush, have the shape of a portion of cylinder, or of a spherical cap;

then subjecting the said reinforcing fibers constituting the bristles of the "convex brush" to an intensive D.C. electrostatic field so as to immobilize the fibers one with respect to the other in a stretched condition, perpendicular to the surface of the base;

(b) in a second step, inserting between said fibers, layers or grids of fibers, disposed successively at 90° from one another, said insertion being carried out while the reinforcing fibers fixed on said base are subjected to the intensive D.C. electrostatic field;

(c) in a third step, removing the elements used for fixing the fibers of the brush;

(d) in a fourth step, impregnating the fibrous structure with a liquid pre-matrix, and optionally subjecting it to a compression for subsequent densification of the resulting pre-material;

(e) finally, in a fifth step, subjecting the pre-material to conditions permitting the formation of the matrix.

BRIEF DESCRIPTION OF THE INVENTION

The process according to the invention will be more readily understood on reading the following description given by way of example and non-restrictively, of the different steps of the process, in general, and of possible variants thereof in particular, reference being made to the accompanying drawings, in which FIGS. 1 to 12 illustrate diagrammatically the different steps of the process.

DETAILED DESCRIPTION OF THE INVENTION

The first step of the process according to the invention therefore consists in producing a convex brush of equally distributed fibers, said fibers being in a stretched condition, regularly spaced out and secured in position; one preferential embodiment of this first step is illustrated in FIGS. 1 to 5.

Figure 1:
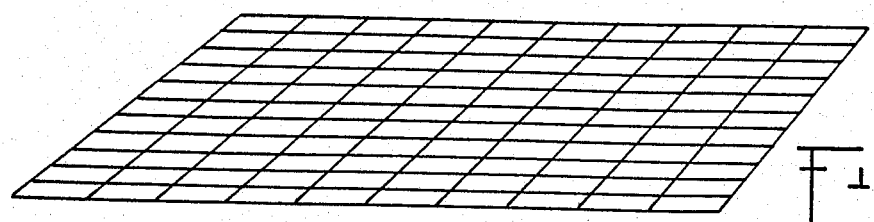

A mono-directional assembly of fibers (glass; polyamide, carbon, alumina, boron or like fibers), being in the form of a plate such as shown in FIG. 1, is used as starting product.

Figure 2:
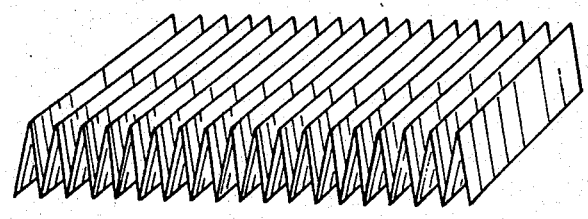
Figure 3:
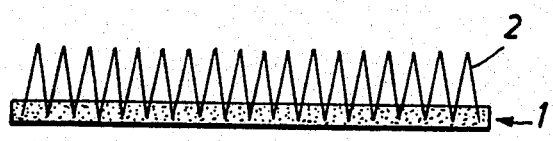

Said mono-directional fiber structure is then folded (automatically, for example) as illustrated in FIG. 2; it will be noted that the number and the disposition (more or less close together) of the fibers which will form the "brush", will be dependent on the aforesaid folding operation; indeed, the number of fibers will be the greater that the folding is tighter; the folds are thereafter fixed in position by placing along one edge of the folded material a supple strip, for example of cellulose acetate, as illustrated in FIG. 3 (on said FIGURE, said strip is referenced 1 and the folded structure 2).

Figure 4:
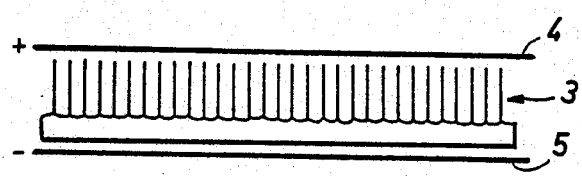

Next, the top parts of the folds are cut, and the result is a kind of brush, shown as 3 in FIG. 4. Said brush is placed in a high tension D.C. electrostatic field, for example between 50,000 and 200,000 volts between electrodes 4 and 5. The electrostatic field stretches the fibers and keeps them at equal distance from one another. Then, advantageously, while the brush is undergoing the treatment of the electrostatic field which keeps the vertical fibers in a rigid condition, a product, which is the same as that used for producing the base 1 in FIG. 3, is sprayed over the brush. This coating operation will use a product which can be subsequently dissolved and destroyed.

The brush, then obtained, and which is made up of fibers held, by one of their ends (1), parallel together, and in a position perpendicular to the base (or strip 1) due to the use of the electrostatic field, is convex. This is an extremely important operation in the course of the present invention since, as a result of it, a convex brush is obtained in which the bristles are, on the one hand, sufficiently dense (at their base), but on the other hand, sufficiently spaced out (at their free end) to allow the operations to follow according to the invention.

Figure 5:
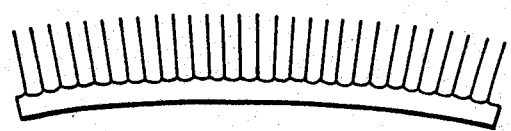

The convex brush is diagrammatically shown in FIG. 5.

Figure 6:
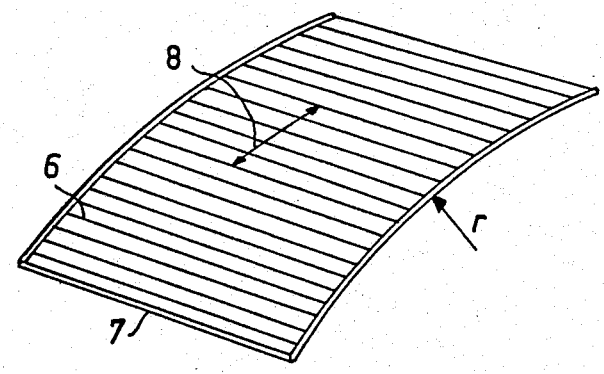

The second step in the process according to the invention is illustrated in FIGS. 6 to 9; it consists in successively placing a number of grids (having the same convexity as the brush) between the fibers of the brush. In FIG. 6, fibers (or fibrils) are stretched on a frame 7 in order to form a grid; said frame has a predetermined curvature of radius r, the same radius as the brush. The fibers laid on said frame are stretched but movable, so as to be moved closer together in the direction of arrows 8.

Figure 7:
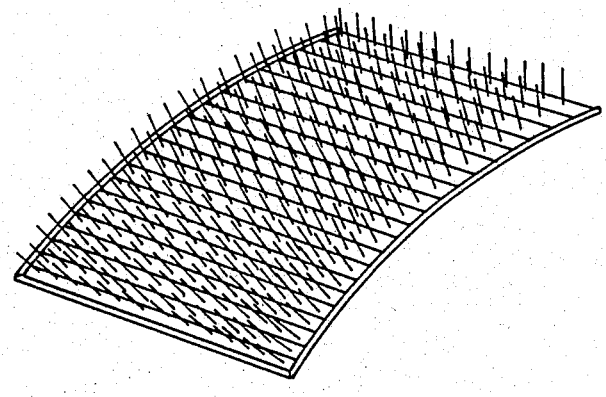

Said frame is thereafter fitted over the brush shown in FIG. 5, the result being a bi-dimensional assembly in the warp direction and in the vertical direction, as shown in FIG. 7. The described curvature makes it easier to introduce the vertical fibers in the warps and the wefts.

It may be advantageous, after positioning the grid between the fibers of the brush, to treat the whole assembly in an electrostatic field such as hereinabove described for producing the brush, in order to help the accurate positioning of the fibers one with respect to the other.

The above operation is repeated until a suitable stack of grids is obtained. Obviously, the stacking can be obtained by placing the fibers of each grid in the same direction, or in different directions, which will produce materials having different properties. Obviously also, each grid can be different from the other, either by the number of fibers used (for example, it is possible in certain grids, to take off one fiber out of two), or if necessary even, by the nature of the fibers used; it is finally possible to produce a non-homogeneous material, for example by stacking over a certain thickness, grids in which the fibers are oriented in the same direction, and over another thickness, grids in which the fibers are alternately oriented in two perpendicular directions.

The following illustrates one particular embodiment of the invention applied to the preparation of a material having a tri-dimensional orientation, i.e. a material constituted of mono-directional fibers in a plane X or warp, and of a lattice of fibers in a plane Y or weft, with other fibers (called brush) forming an angle of 90° with the warp and with the weft in a plane Z.

Figure 8:
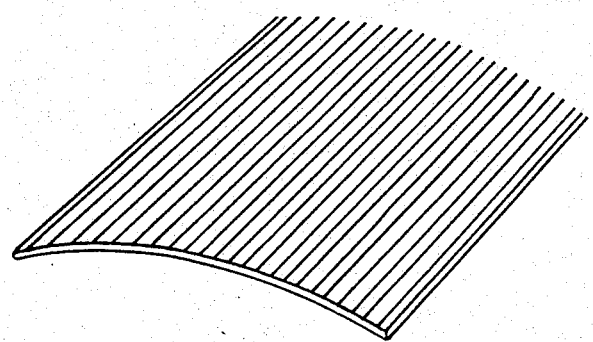
Figure 9:
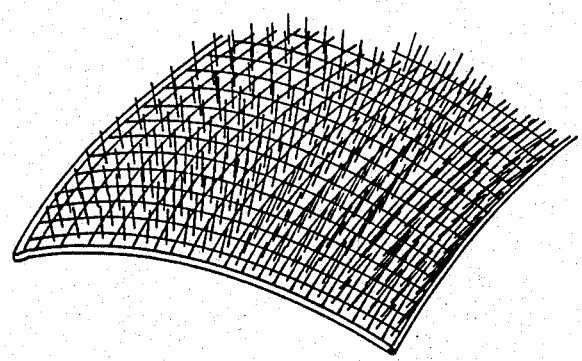
Figure 10:
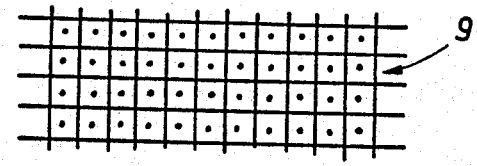

The same operation of inserting a grid between the fibers of the brush, will be performed to produce materials having a tri-dimensional orientation, except that the fibers of the grid will be oriented in a direction perpendicular to the orientation of the fibers of the next grid below. This is what is illustrated in FIGS. 8 and 9, where the grid of FIG. 8, suitably curved and of which the fibers are oriented perpendicularly with respect to the fibers of the grid of FIG. 6, is disposed (FIG. 9) over the material of FIG. 7. This operation (stacking of suitably oriented grids), repeated as many times as is necessary, to reach the height required for the product, and the diameter of the fibers, will in the end give a tri-dimensional structure such as that illustrated in plan view in FIG. 10. The result then is a tri-dimensional structure forming an assembly according to X, Y, Z, in the form of a spherical cap of large radius.

The third step according to the invention consists in removing the products used, on the one hand for making up the base of the brush, and on the other hand, for fixing the fibers of the brush. This removing operation is advantageously carried out (if the materials involved permit it) by simple dissolution with a solvent; the selected solvent is also used for clearing the surface of the fibers so as to facilitate subsequent interactions between fibers and matrix.

The network of fibers is then dried and the matrix-forming liquid is introduced therein. As conventionally known, said liquid may be, depending on the case, either the matrix material in molten state, or a material (such as prepolymer) which, by subsequent transformation, will produce the matrix. This type of impregnation operation is well known of to any one skilled in the art.

When the impregnation is completed, the frames holding the fibers of various grids, are detached, and the resulting structure is laid flat or shaped as necessary; any excess of matrix (or of matrix precursor) can then be removed.

Figure 11:
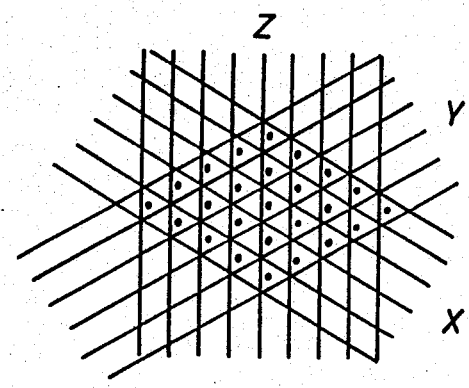

This particular operation really gives a tri-dimensional structure X, Y, Z such as illustrated in FIG. 11.

Figure 12:
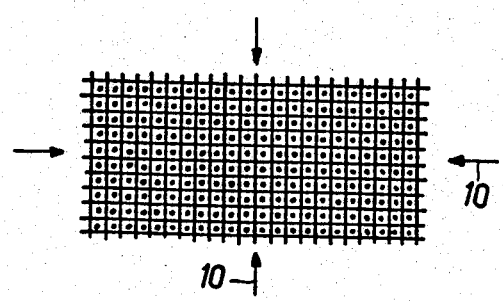

But to obtain a very compact product containing a minimum of matrix, i.e. just enough to embed the fibers, lateral and vertical pressures can be exerted in the direction of arrow 10, as illustrated in FIG. 12. Then, after polymerization of the matrix, the resulting tri-dimensional fiber-matrix assembly has a very close structure, which shows absolutely remarkable properties of bending, breaking, compression and shear strength.

It is further noted that, conventionally, when fibers such as those used in the present invention for producing the reinforcement, are subjected to an A.C. electrostatic field of about 25,000 volts, an etching of the fiber surface occurs, the consequence of which is to improve adherence of the matrix to the fibers. It is therefore possible, at one stage or another in the process according to the invention, to subject the fibers to such a treatment by an A.C. electrostatic field.

To produce, for example, a structure able to withstand very high temperatures, a carbon matrix can be introduced in the form of pitch in pure state and after compression and polymerization of the assembly in vacuo in an autoclave, a well known carbon-carbon type structure such as those widely used in aerospace technology and in medical prostheses, is obtained.

With the process according to the invention, a plate has been produced of dimension 150×100×16 mm, with:
as fibers, Brochier-Toray carbon fibers,
as resin, a tri-component Ciba-Geigy ref:
    base: LY 556, an epoxy resin
    setting agent: NY 917
    accelerating agent: DY 070.
polymerization of said resin was performed with a slow rise in temperature (effective polymerization: 8 hours at 140° C.).
electrostatic field for positioning the fibers:
    D.C. of 100,000 volts for 7 minutes
    A.C. of 15,000 for 3 minutes,
about 30 layers of grids stacked in two perpendicular directions,
pressure applied before polymerization: 6 t/dm2,
fibers-matrix distribution: 73% fibers, 27% resin.

The resulting plate was put through breaking stresses under bending forces of 1600 Gp, in the three axes without any deformation being noted.

The material finally obtained may be shaped or subsequently machined for producing special high resistance parts.

The advantages of the process according to the invention are as follows:

(1) Rather low production costs compared with all the existing systems.
(2) Adaptability for continuous production.
(3) Production of complex structures to meet unequal breaking loads throughout.

What is claimed is:

1. A process for the preparation of a composite material formed of reinforcing fibers, regularly distributed and oriented in more than two directions, and of a matrix filling up the space between said fibers, said process comprising the steps of: (a) in a first step, producing a convex brush of said reinforcing fibers, regularly distributed and fixed by fixing elements by one of their ends on a convex base, said fibers being subjected to an intensive DC electrostatic field, oriented in parallel to said fibers so that the fibers are immobilized in stretched condition perpendicularly to the surface of the base; (b) in a second step, inserting between said reinforcing fibers layers of fibers, disposed successively at 90° from one another, said inserting being carried out while the reinforcing fibers fixed on said base are subjected to the intensive D.C. electrostatic field; (c) in a third step, removing the fixing elements used for fixing the fibers of the brush leaving a fibrous structure; (d) in a fourth step, impregnating the fibrous structure with a liquid pre-matrix; and (e) finally, in a fifth step, solidifying the liquid pre-matrix into a solid matrix.

2. The process of claim 1, further including the step of subjecting the fibrous structure to a compression for subsequent densification of the resulting pre-material.

* * * * *